United States Patent
Koukoumidis et al.

(10) Patent No.: US 10,581,765 B2
(45) Date of Patent: Mar. 3, 2020

(54) CONVERSATION BOT DISCOVERY AND RESPONSE FUSION

(71) Applicant: Microsoft Technology Licensing, LLC, Redmond, WA (US)

(72) Inventors: Emmanouil Koukoumidis, Kirkland, WA (US); Joseph Edwin Johnson, Jr., Seattle, WA (US); Donald Brinkman, Seattle, WA (US); Dustin Abramson, Bellevue, WA (US); Oussama Elachqar, Seattle, WA (US); Hailong Mu, Redmond, WA (US); Maria Alexandropoulou, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 155 days.

(21) Appl. No.: 15/620,724

(22) Filed: Jun. 12, 2017

(65) Prior Publication Data

US 2018/0287968 A1 Oct. 4, 2018

Related U.S. Application Data

(60) Provisional application No. 62/480,958, filed on Apr. 3, 2017.

(51) Int. Cl.
*H04L 12/58* (2006.01)
*G06F 16/951* (2019.01)
(Continued)

(52) U.S. Cl.
CPC ............ *H04L 51/02* (2013.01); *G06F 16/248* (2019.01); *G06F 16/951* (2019.01); *G06F 17/2775* (2013.01)

(58) Field of Classification Search
CPC ..... H04L 51/02; G06F 16/248; G06F 3/0482; G06F 17/279
(Continued)

(56) References Cited

U.S. PATENT DOCUMENTS 6,397,212 B1  5/2002  Biffar
8,285,652 B2  10/2012  Biggs et al.
(Continued)

FOREIGN PATENT DOCUMENTS

EP    1677218 A2    7/2006

OTHER PUBLICATIONS

Boutin, Paul, "Chatbots Magazine", https://chatbotsmagazine.com/theres-a-bot-for-that-a-search-engine-for-finding-bots-8a2c1145072b, Retrieved on: Mar. 21, 2017, 2 pages.
(Continued)

*Primary Examiner* — Minh Chau Nguyen
(74) *Attorney, Agent, or Firm* — Jeffrey L. Ranck; Ranck IP Law

(57) ABSTRACT

Representative embodiments disclose mechanisms for discovering, synthesizing, presenting and interacting with multiple chat bots. A broker system can interact with a user and receive a query which is passed to a search engine. The search results are evaluated for bots provided by domains. The query can be submitted to the discovered bots. For domains that do not provide a bot, a bot can be synthesized if desired and the query submitted to the synthesized bots. Answers from the bots are retrieved. Answer are directly presented for bots that are directly surfaced to the user in the search results page. Answers can be fused for bots that are not directly surfaced to the user and presented via a broker bot. Answers from the one bot can be fed to other bots so that the bots can participate in a group chat between bots and the user.

18 Claims, 10 Drawing Sheets

(51) Int. Cl.
*G06F 16/248* (2019.01)
*G06F 17/27* (2006.01)

(58) Field of Classification Search
USPC .......................................................... 709/206
See application file for complete search history.

(56) References Cited

U.S. PATENT DOCUMENTS

| | | | |
|---|---|---|---|
| 2003/0220909 A1 | 11/2003 | Farrett | |
| 2008/0288349 A1* | 11/2008 | Weisberg | G06F 17/30899 705/14.54 |
| 2009/0106040 A1* | 4/2009 | Jones | G06Q 30/02 705/319 |
| 2009/0281966 A1* | 11/2009 | Biggs | G06F 17/30864 706/11 |
| 2016/0125460 A1 | 5/2016 | Zellner et al. | |
| 2018/0025085 A1* | 1/2018 | Sarangi | G06F 3/0482 707/722 |
| 2018/0061400 A1* | 3/2018 | Carbune | G06F 17/30657 |
| 2018/0210874 A1* | 7/2018 | Fuxman | G06F 17/2785 |
| 2018/0225365 A1* | 8/2018 | Altaf | G06F 17/27 |
| 2018/0239837 A1* | 8/2018 | Wang | G06F 17/30979 |

OTHER PUBLICATIONS

"Bot Finder", https://botfinder.io/, Retrieved on: Mar. 21, 2017, 3 pages.

"There is a bot for that", https://thereisabotforthat.com/, Retrieved on: Mar. 21, 2017, 6 pages.

Koonce, Ryan, "Kiss Metrics: Beyond SEO: Googlebot Optimization", https://blog.kissmetrics.com/googlebot-optimization/, Retrieved on: Mar. 21, 2017, 19 pages.

Hu, Jim, "Cnet: MSN search bot a glimpse of ambitions", https://www.cnet.com/news/msn-search-bot-a-glimpse-of-ambitions/, Published on: Jun. 19, 2003, 11 pages.

"International Search Report and Written Opinion Issued in PCT Application No. PCT/US2018/024691", dated Jun. 11, 2018, 15 Pages.

* cited by examiner

CONVERSATION BOT DISCOVERY AND RESPONSE FUSION

FIELD

This application relates generally to conversation (chat) bots and more specifically to new mechanisms for presenting multiple bots to a user and combining responses from multiple bots.

BACKGROUND

Conversational bots (chat bots) are becoming ever more popular and companies are struggling to integrate chat bots into how users, customers and clients interact with products and services. While chat bots offer users a very natural user interface for the discovery of information, their use, especially as their numbers continue to grow fast, is hindered by their discoverability and the fact that it is currently impractical for users to inquire and interact with several such bots at the same time.

It is within this context that the present embodiments arise.

DETAILED DESCRIPTION

Figure 1:
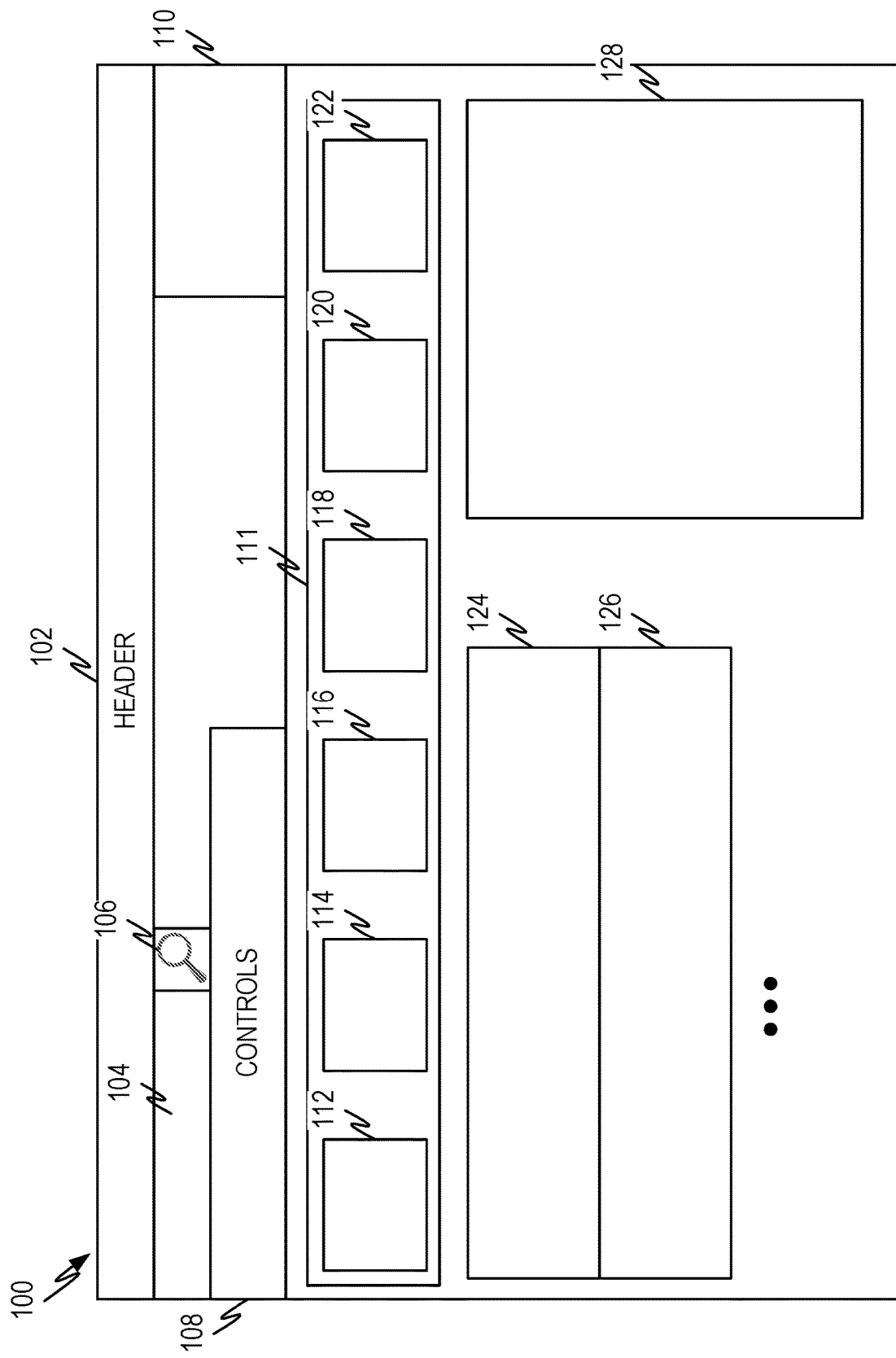
FIG. 1 illustrates an example of how a user might interact with bots in a prior art search system.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Overview

Embodiments of the present disclosure target the problems that occur when multiple bots are integrated into the same environment. Prior approaches to this problem require users to discover whether a provider has integrated a bot into their system one by one, such as by clicking on a link or otherwise activating a provider's system. Interacting with different provider's bots required a user to interact with each bot separately, restarting a conversation with a new bot if a current conversation does not lead to a satisfactory result. This makes it impossible for user to interact with multiple bots and no current environment exists to solve this issue. Furthermore, discovering whether a conversation bot exists is a hit and miss proposition since there is no mechanism to identify the bots that exist in such an environment.

This disclosure presents new mechanisms for presenting the existence of multiple chat bots, for interacting with multiple bots, for creating an environment where multiple bots can interact with each other, for combining answers from multiple bots and other aspects as disclosed below. In one aspect, a user can submit a query (referred to interchangeably as a query or question herein) into a search engine interface. A broker system examines the search engine results page and identifies domains that provide chat bots. When the search engine results are presented to the user, the existence of the chat bots is indicated in the user interface.

In other aspects, the existence of other chat bots is hidden from the user and the results page presents a broker bot to the user that can act as a broker between the user and other bots, fusing the other bots' answers into an appropriate response or set of responses to the user.

In still other aspects, the existence of both provided chat bots and the broker bots is presented to a user. Users can choose to interact with the broker bot or with one or more individual bots on the page. The broker can pass answers and state between bots to allow the bots to maintain the state of the conversation with the user, interact with each other and other such functions. This allows a user to abandon a conversation with one bot and resume the same conversation with another bot without having to restart the conversation. Additionally, or alternatively, the broker bot can stand as a keeper of the conversation state and pass the state to other bots.

In still other aspects, the broker and/or broker bot can keep certain user data and provide it at an appropriate time to one or more chat bots as indicated by the user. For example, the user can ask the broker and/or broker bot to provide private information (name, address, payment information, etc.) to an authorized bot as part of a conversation with the authorized bot.

DESCRIPTION

FIG. 1 illustrates an example 100 of how a user might interact with bots in a prior art search system. This diagram is a prior art search results page to present search results from a query entered by a user and comprises a header area 102 which generally contains header information for the browser or other program being used to access the search engine. The header area 102 can comprise, for example, an address bar, forward/back buttons, and other such controls.

The results page also comprises a search box 104 which is an area where a user can enter a query and a control 106 which the user can manipulate to enter the query in order to retrieve search results relevant to a query. The results page can comprise a controls area 108 which contains controls for the search engine. For example, the controls area 108 can comprise different types of data the user would like to search, for example "web," "images," "videos," "maps," "news," and the like.

The results page can also comprise one or more other areas 110 where other information can be presented, such as an option to sign in, change settings for the searches performed by the search engine, bring up search history, change user profile settings, and so forth.

When a user enters a query into search box 104 and submits the query (i.e., by pressing the search control 106), the results page can comprise different areas where search results can be presented. Different search engines will present the results in slightly different formats, such as a linear list, or various different regions as in the representative example of FIG. 1. In the example of FIG. 1, local results, results that are more relevant, or results that in some other way distinguish themselves, may be presented in one region 111. For example, if the query is "order pizza" the region 111 may comprise pictures and/or links (112-122) to local businesses that can provide the requested service.

Additionally or alternatively, results can be presented in a linear list (e.g., 124, 126). The results page can also comprise another region 128 where additional information that is relevant to the search results can be presented. For example, the region 128 can comprise a map or other overview to give the user insight into where the pizza shops presented in the search results are located.

Any or all of the providers linked to by the search results shown on the results page can provide additional services, such as a chat bot to allow users to fulfill their wishes. In the case of the query "order pizza" the user may click on a particular result, such as result 118, and the browser will open the corresponding web page/web service for the user. If the search result 118 was linked to "The True World's Best Pizza Shop" and if that business provided a chat bot to help users order pizza, the search result 118 may open a chat bot or a web page comprising a chat bot. The user could then engage in a dialog to order the desired pizza:

Bot: What can I help you with?
User: I'd like to order a pizza with pepperoni.
Bot: What size?
User: I'd like to feed 10 people.
Bot: I'd recommend 3 large. What is your address.
User: 233 Sunnyside.
Bot: I can have those to you in 45 minutes.

If the user decides to proceed, the user can enter payment and other requested information and complete the transaction. If, however, the user decides that 45 minutes is too long, the user would have to start over by selecting another search result and have the same or a similar dialog. The user would repeat this process until they were satisfied with the result.

Although ordering pizza was the example used above, the same would apply for any query or topic presented by a user. If, for example, the user was attempting to gain insight on a topic or how to fix a problem with a washer or any other internet query, the process would be the same. The user would identify a result to try, click on the result, interact with a bot (if available), and continue the process until the use was satisfied with the result.

The process is both inefficient and can be frustrating to a user. In many cases, rather than be helpful, the presence of chat bots simply lengthens the time it takes the user to accomplish what they are trying to achieve. Thus, numerous problems exist with the exiting approaches.

Figure 2:
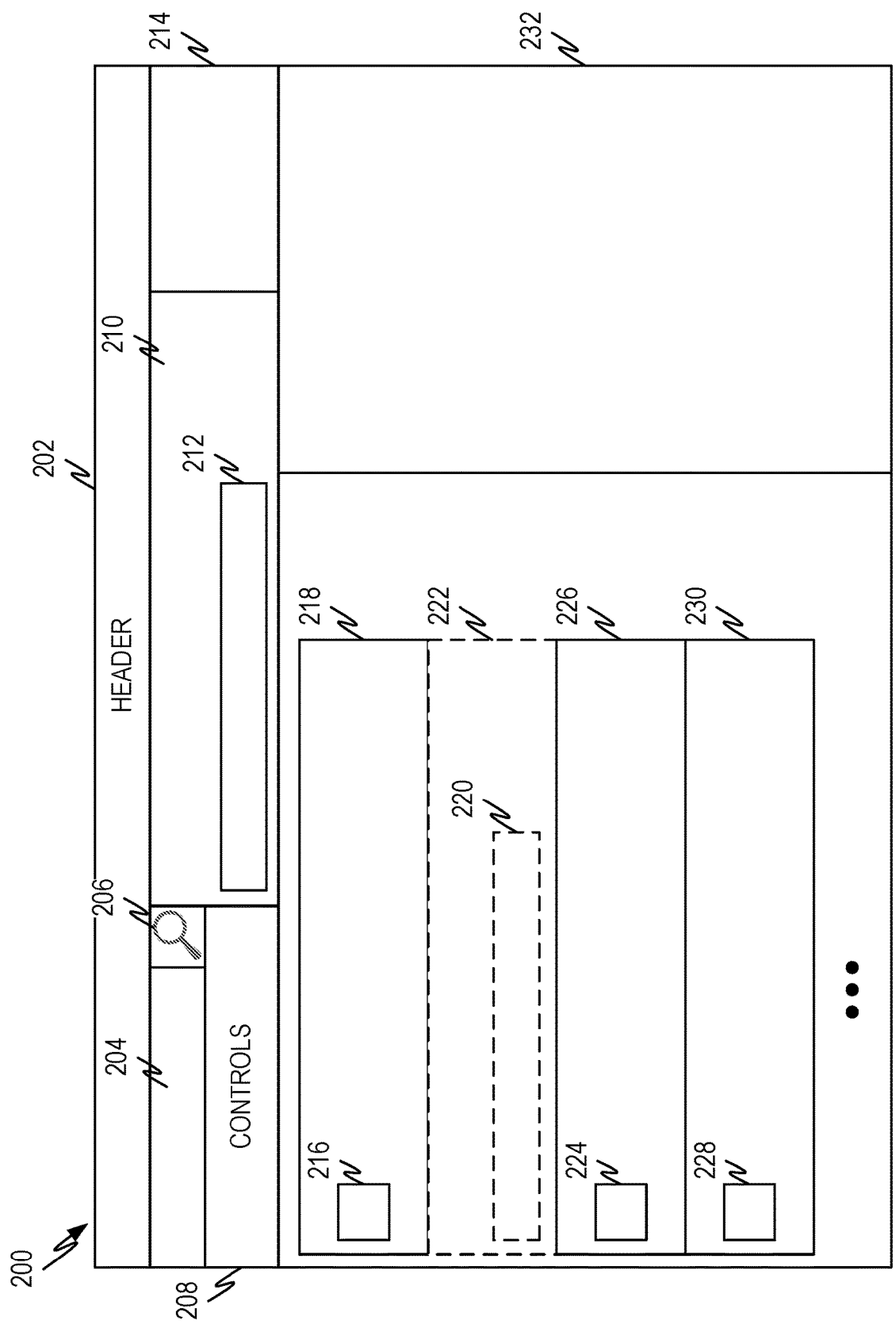
FIG. 2 illustrates an example of how a user might interact with bots according to some aspects of the current disclosure.

FIG. 2 illustrates an example 200 of how a user might interact with bots according to some aspects of the current disclosure. This example 200 will be used to present several scenarios. Thus, the example 200 has more user interface elements than might exist in any single scenario. The explanations below will attempt to identify which interface elements are present in each scenario. Other interface elements may or may not be present for any single scenario.

The results page illustrated in example 200 can comprise a header area 202, search box 204, search control 206, controls 208, and other areas 214, which can operate as explained in FIG. 1 above (e.g., header area 102, search box 106, search control 106, controls 208, and other areas 110), with the exception that some controls, information, etc. may be different due to the different functionality that is included in 200. Thus, controls 208 and/or other area 214 may include controls, options, information, and so forth that do not exist in the example of FIG. 1.

The example of FIG. 2 also comprises a broker chat bot 210 (also referred to as a broker bot) along with the ability to enter text or other input, controls, etc. represented by area 212. Output from the broker bot 210 and/or input from the user can be displayed within the area of broker bot 210 or displayed elsewhere on the results page. The broker bot 210 can function as an independent chat bot (e.g., a chat bot for the search provider) or can be a broker for other chat bots from other service/results providers as explained below. When acting as a broker for other bots, the broker bot 210 can fuse or otherwise combine answers/output from other bots and be an interface for a combined group of bots for the user as explained below. The broker bot 210 has its own distinct personality although where the broker bot 210 acts as a broker for other chat bots, its personality may change a bit from a baseline personality due to the fusion of results/answers that are accomplished by the broker bot 210.

The results page can also comprise search results from an input query such as results 218, 226, 230 and so forth. Each search result is typically associated with a website, address, storage location, etc. Often the search results comprise a link or other control that can be activated to retrieve information from the website, address, storage location, etc. These sources and/or locations where the search results link to will be referred to as domains or providers herein. As indicated below, a domain may have an associated chat bot. Operation of the results and user interactions with the results in different scenarios are explained below.

As a first scenario, the broker bot 210 provides an interface for and fuses results from other bots that may be associated with search results. Utilizing the pizza example from above, the user may enter into the search box 204 the query "order pizza" and submit the query (i.e., by activating the search control 206). The query is submitted to a search engine which returns search results (e.g., 218, 226, 240, etc.).

When the search results are returned, the system can enumerate the results that have associated chat bots as explained below. The query can also be submitted to the result chat bots and answers from the result chat bots evaluated as explained below. In addition to "real" chat bots, the system can synthesize a chat bot for results that do not implement and/or have an associated chat bot. This process is explained in greater detail below.

When all answers from the real/synthesized chat bots are received, the system can fuse the answers as well as any answer(s) from the broker bot itself into one or more answers for display via the broker bot. As a representative example, suppose the bots (real and/or synthesized and/or broker bot) provide the following answers:

Bot1: We have a special tonight. Large pepperoni pizza for $5.99.

Bot2: We can help with that. Let's get started. What type of pizza do you want?

Bot3: Our delivery time is only 20 min. Fastest in the region!

Bot4: Our pizza is rated the best in the valley!

The system select one or more answers for display and/or fuses the answers into one or more answers for display. If answers are selected for display the bots answers can be ranked or rated on a variety of criteria. Ranking can be based, for example, on one or more of the criteria:

which bot has a personality preferred by the user;
which bot is more popular than the others (i.e., a popularity rating for the chat bot);
which bot provides more relevant answers (e.g., answers that are more relevant and/or provide more information than the other bots);
which bots provide a better dialog (e.g., a dialog rank for the bot); and/or
other criteria The ranking on each of these dimensions can stand alone and one dimension selected as a primary ranking with other dimensions acting as a tie breaker. Additionally, or alternatively, the various rankings can be combined into a single ranking, such as through a machine learning algorithm or other combinatorial mechanism (e.g., weighted sum, etc.). In one aspect, the bots are ranked according to various criteria and a machine learning algorithm is used to produce an overall ranking. One or more supervised or unsupervised machine learning processes, such as a support vector machine (SVM) technique, a convolutional neural network, a deep neural network, decision tree process, k nearest neighbor process, kernel density estimation, K-means clustering, expectation maximization, and so forth can be used to combine the rankings into an overall ranking. These individual machine learning processes each have training processes (supervised or unsupervised). Initial training can be accomplished either by starting with a "standard" model that adapts over time to be personalized or by using a batch of collected data for initial training.

If, for example, the system ranks answers that provide real information higher than those that do not, then the answer from Bot1 (which provides information about a current special) and the answer from Bot3 (which provides information about delivery time) can be ranked higher than the other answers from Bot2 and Bot4, which at this stage have not provided much information that is helpful. In an embodiment which selects answer(s) and ranks them without fusing them according to this criteria, the system may select answers from Bot1 and Bot3 to display.

When answers are fused, the process can be performed in a variety of ways. Any process that creates answers that "make sense" and are helpful can be used. As one representative example, the answers and/or sentences in the answers are treated as vectors. The vectors can then be evaluated by rank, similarity and so forth to combine the vectors into one or more fused answers. A representative fusion process is discussed in FIG. 9 below, but in summary, the vectors and/or answers are sorted (i.e., according to a ranking criteria). Once the answers are sorted, a filter can be applied to eliminate "low" scoring answers and/or vectors. A similarity or other score can be calculated for each answer/vector to identify which answers and/or vectors go with each other and thus have a greater likelihood of making sense to a user. The answers and/or vectors are then combined based on the score. A selection process then selects one or more answers based on one or more criteria.

In the example above, the fusion may result in an answer such as: "Tonight I can get you a special on a large pepperoni for $5.99 from one shop or a 20 min. delivery time from another place." The user can then continue the discussion.

As the user interacts with the broker bot 210, the system passes the user's input to one or more of the other bots. The bot to which the input is directed will receive the user's input. For example, if, in response to the answer above, the user states "great let's get a pizza here fast. I'd like 3 large combinations," the broker bot 210 would route the input to the bot that noted the 20 min. delivery (i.e., Bot3 above). In addition, the system can pass the user's input to other bots in the list, so that they can keep up on the state and even compete with the other bots. For example, in response to the user's input, Bot4 may note that its delivery time is only 15 min., which can then be passed (alone or in a fused response) to the user. The process of keeping other bots up to date on the state of the conversation is discussed in greater detail below.

Although ordering pizza was the example used above, the same would apply for any query presented by a user, and does not necessarily need to involve a transaction with a provider.

As a second scenario, the broker bot 210 can act as a separate bot and the user interface of FIG. 2 can surface individual bots implemented by the providers directly to the user. How the system surfaces the individual bots can take a variety of forms, and different embodiments can surface the individual bots in different ways. As one example, when the user enters a query, the system submits the query to the search engine and evaluates the results returned. The results that provide bots can be identified as described below. Additionally, or alternatively, results that do not have an associated bot can have a bot synthesized for the search result as discussed herein.

Once the system identifies results that have associated bots (either implemented by the provider or synthesized by the system for the provider), the user interface can surface the bots in a few different ways. For example, results with associated bots can have an indicator associated with the search result. In FIG. 1, search result 218 has indicator 216, search result 226 has indicator 224 and search result 230 has indicator 228. Although all the results are shown as having an indicator that allows a user to ascertain that the result has an associated bot, not all search results may have an associated bot (either real or synthesized).

By clicking or otherwise activating the indicator, the system can open an area, window or other region that reveals the bot interface to the user. Thus, a user that activates indicator 216 will be presented with a chat bot 222 which has an area 220 where input can be made directly to the chat bot 222. This allows a user to directly interact with a selected bot and see the responses from the bot directly (e.g., in area 222).

Rather than requiring a user to activate an indicator to reveal the associated chat bot, one or more of the chat bots associated with search results can be automatically displayed. If less than all the chat bots associated with search results are displayed, the system can use various criteria to determine which chat bots are automatically displayed and which remain closed until, for example, the use activates the associated indicator. In one example, the bots can be ranked, such as by one or more of the criteria discussed above and those bots with a ranking higher than a threshold can be automatically displayed. When a machine learning model is used to rank the bots, the machine learning model can be trained to learn a user's preferences. Thus, if a user likes a bot (e.g., as indicated in a user profile, by user input, or based on user interaction with bots) and that that bot turns up in a list of search results, the bot may be automatically displayed (i.e., the user interface to the bot automatically presented without requiring the user to activate an associated bot indicator). In these scenarios, the broker bot 210 can act as its own bot or can fuse the responses to uncovered bots.

Utilizing the pizza example from above, the user may enter into the search box 204 the query "order pizza" and submit the query (i.e., by activating the search control 206). The query is submitted to a search engine which returns search results (e.g., 218, 226, 240, etc.). The system enumerates the bots provided by domains returned in the search results (described below) and, in some embodiments, synthesizes any desired bots for domains that do not have associated chat bots. As described above, the bots can be covered or uncovered based on one or more criteria. Furthermore, for covered bots, an indicator (i.e., 216, 224, 228) can be provided for domains that have bots (either provided by the domain or synthesized) that are covered.

In this example, the two uncovered bots of FIG. 2 are the broker bot 210 and the bot 222. The system can feed the user input (i.e., "order pizza") to the uncovered bots, the covered bots, or any combination thereof. The uncovered bot 222 can provide its answer which can be displayed in the region 222. The broker bot 210 can provide its answer and/or a fused answer for the covered bots as previously explained. As an example, the uncovered bot 222 and broker bot 210 may provide the answers:

Bot 222: No waiting. Pizza delivered in 30 minutes.
Bot 210: Specials and quick delivery tonight!

As previously mentioned, the answer from broker bot 210 may be a fused answer. Even if the answer is not a fused answer (e.g., from the uncovered bots and the broker bot itself), the system can ensure that all bots receive the answers from the other bots so that they can keep up with the conversation and even play off other bots' answers. Continuing the example, suppose the user starts interacting with bot 222 directly:

User: I'd like one large cheese pizza and three combination delivered in 30 minutes.
Bot 222: The total cost will be $27.45.

Because the interaction with the user and the bot 222 answer are being provided to the other bots, the other bots can keep track of the dialog and even inject an answer into the conversation. In one embodiment, the answer can be injected through the broker bot 210 since the other bots are not uncovered. In this instance, the broker bot can simply display the answer that the bot intends to inject into the dialog. Alternatively, or additionally, the system can uncover the bot so the bot can provide its input directly (i.e., in its respective bot UI).

Bot 228: Order from Pizza Now and we will give you that order for $25 even with 25 minute delivery.

The user then has the option of continuing the conversation with the bot 222 or continuing the conversation with the bot 228. By providing answers and input to all bots, the bots can keep track of where the conversation is (e.g., the state of the conversation) and provide answers as desired. Furthermore, if the user decides to abandon the conversation with one bot, the user need not start the conversation over with a newly selected bot. This provides a great increase in efficiency and reduction in communications, data transfer and so forth over prior art solutions.

In addition, because the bots are all privy to the conversation and answers of other bots, the bots can interact directly, if desired. Such direct interaction may or may not be displayed to the user, depending on the embodiment and/or the content of the interaction. In other words, bots can all be part of a group conversation, not only with the user, but with each other.

In yet another aspect, the broker bot can be the broker not only for fused answers from bots, but can also be the broker of information from the user to one or more bots as authorized by the user. For example, the broker bot 210 can hold a trusted position with the user and the user can either provide or can have previously provided personal information to the broker bot 210. The user can then direct the broker bot to provide some aspect(s) of the personal information to a selection of bot(s). Continuing with the pizza example, suppose the user has provided the broker bot 210 with address and payment information. The user is satisfied with the deal struck with the bot 222. The bot 222 asks for the address and payment information. The user could provide the requested information directly or could simply direct the broker bot 210 (e.g., through the broker bot's interface) to provide payment and address information to the bot 222.

Since the bot 222 is the only bot the user has authorized the broker bot 210 to dispense the information to, the broker bot 210 would only provide the information to the bot 222 and not to the other bots. In this way, the user need not reenter previously provided information and only authorized bots receive the information. Additionally, or alternatively, the user could type of the private information into the broker bot 210 user interface, instruct the broker bot 210 to both save the information for later and provide the information to the bot 222.

Figure 3:
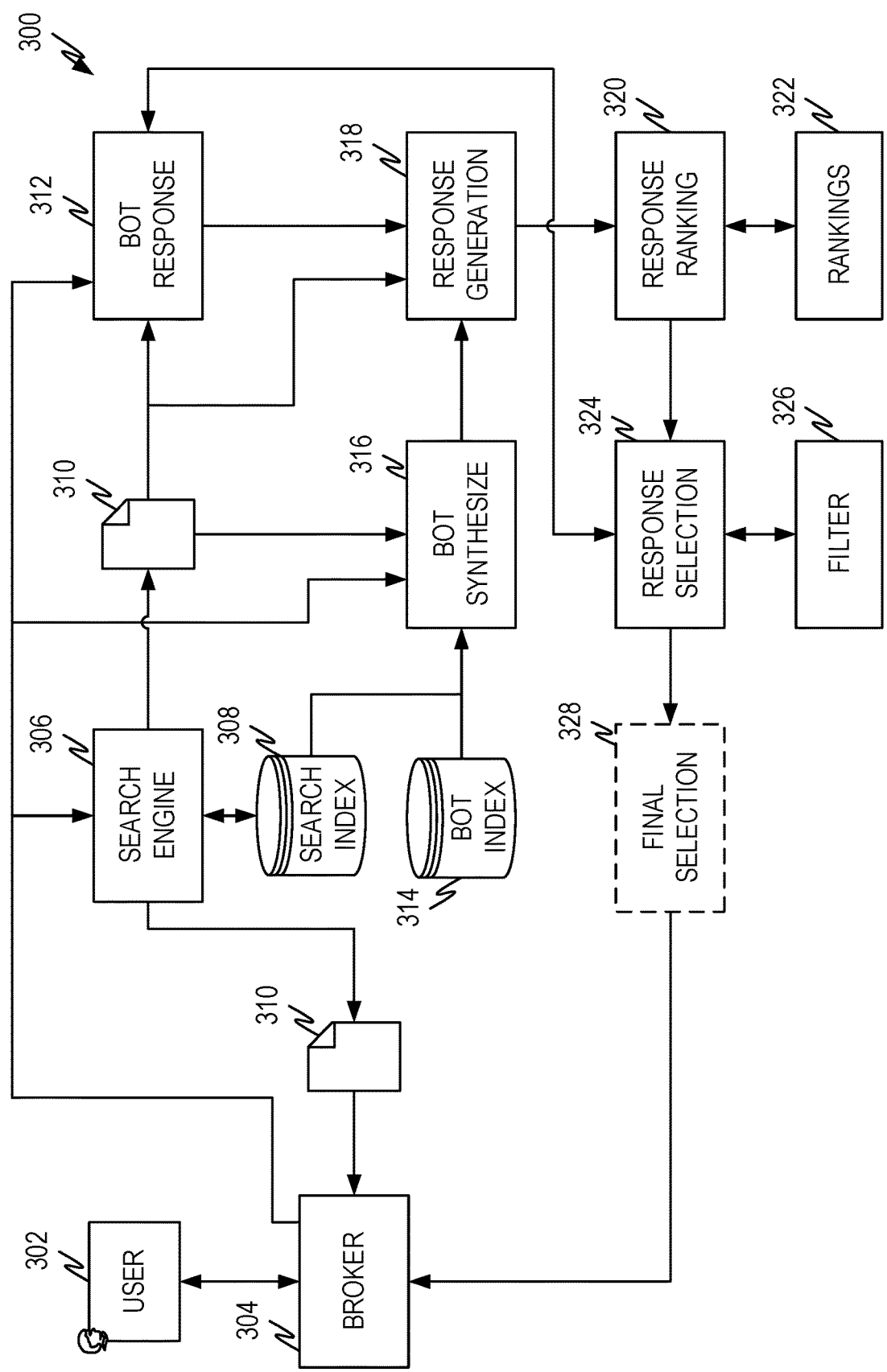
FIG. 3 illustrates an example architecture for interacting with multiple bots according to some aspects of the current disclosure.

FIG. 3 illustrates an example architecture 300 for interacting with multiple bots according to some aspects of the current disclosure. The architecture 300 can, for example, be used to implement the aspects discussed above in conjunction with FIG. 2. In this architecture 300, a user 302 interacts with the system and submits a query, such as discussed above. The query can be submitted, for example, to a broker system 304. The broker system 304 provides an interface between the various aspects of the system and the user 304. In alternative embodiments, the broker system can be integrated into a search engine, such as search engine 306.

The query submitted by user 302 is sent to search engine 306. Search engine 306 can be any search engine that returns a set of search results. In some embodiments, search engine 306 is an online search engine such as Bing® or Google®. The search engine utilizes a search index 308 to identify and assemble a set of relevant search results 310. The search results 310 comprise results from one or more providers and/or domains as previously discussed.

The system provides the query to the broker bot and receives its answer. Additionally, or alternatively, the system identifies the bots associated with the search results as discussed below and presents the query to the identified bots and receives answers from the bots. This process is illustrated in FIG. 3 by bot response process 312.

In scenarios where the user is interacting directly with a bot, whether it be the broker bot, a bot associated with a search result, and/or a bot synthesized from information provided by a domain as discussed below, the user input may not be passed to the search engine 306 but may be provided directly to some or all of the bots as discussed herein. Thus, FIG. 3 also shows input from the user being provided directly to bots (bot response process 312 and bot synthesizing process 316).

As discussed above, and as more fully described below, if a domain does not provide a bot (i.e., there is no bot associated with search results from a domain), the system can synthesize a bot for the domain. Although the processes to synthesize a bot are discussed in greater detail below, the basic process is to user the information provided by a domain to develop answers that can be served by a bot that has a personality derived from information available on the domain. For example, if the domain provides content related to medications, dosages, and recommendations for treatment of minor ailments and a user's query comprises: "I have a huge headache," the domain may well include the information that would allow an answer to be constructed. Suppose the domain provides a web page on treatment of minor headache. The information on that web page can be parsed and an answer developed as described below. For example, the web page may state that headaches can be treated by taking 400-800 mg. of ibuprofen or 500-1000 mg. of acetaminophen. An answer could then be created that tells the user "I'm sorry you're not feeling well. You might want to try taking 800 mg. of ibuprofen."

The responses for the synthesized bots and the responses for the provided bots along with the search results can be sent to response generation process 316. This process can fuse the responses from the various bots and/or search results into a fused reply. The process is described further in conjunction with FIG. 9 below. In summary, the process can treat each response as a vector and calculate similarity scores between vectors to identify which vectors lay close to each other. The information in the vectors can then be subject to semantic analysis or another similar process to identify which parts of the vectors may be combined to produce candidate responses. The candidate responses can then be subject further analysis and responses that to not comply with a grammar or other rules can be eliminated from further consideration or reworked according to a set of rules. The response can then be passed to response ranking process 320.

Response generation process 316 can be an optional process that is only performed in those situations where response fusion is desired. For example, as described above in conjunction with FIG. 2, responses can be fused for bots that are covered (e.g., hidden) in that they don't have a user interface visible that allows a user to interact with the bot. This may occur in the various scenarios described herein. Answers from bots that are uncovered or bots that will not be considered for answer fusion can be passed directly to response ranking process 320.

Response ranking process 320 ranks the various replies to allow selection of responses that will be presented to a user. Response ranking process 320 can rely on rankings 322 performed by different ranking processes. Ranking process 320 and/or rankings 322 can be based on specific ranking metrics and/or machine learning algorithm(s) and/or other combinatorial mechanisms. For example, the individual responses can be ranked by one or more ranking processes such as a user personality ranker, a relevance ranker, a popularity ranker, a conversational dialog ranker, and/or other rankers.

A user personality ranker evaluates a response and ranks the response based on how likely the personality of the response will be liked/accepted by the user. As described herein, bots can have different personalities and a user may respond better (i.e., like certain personalities) to some personalities than others. The personality ranker, either based on watching a user interact with different bot personalities, based on collecting feedback from the user, based on user profile information, and/or based on other information, ranks a query.

A relevance ranker can rely on search engine ranking processes to rank a response based on its relevance to input provided by the user (i.e., the original query, input into a bot, etc.). Search engines such as Bing® or Google® have sophisticated processes to identify relevant search results and return them. These processes can be used to identify how relevant an answer is to a question/query.

A popularity ranker evaluates a response and ranks the response based on popularity, either for a given user or across users. Search engines such as Bing® or Google® also have sophisticated processes to identify popularity of search results, queries, answers, and so forth. These processes can be used to identify how relevant an answer is to a question/query.

A conversational dialog ranker evaluates a response and ranks the response based on the quality of the dialog. Quality of dialog can be evaluated in different ways. In one embodiment, the quality of the dialog is determined by how relevant the answers are to the question. Thus, when a question is entered and an answer given, the two can be compared and the relevance of the answer to the question can be evaluated and rated, such as by algorithms used by a search engine to ascertain relevance. Additionally, or alternatively, the sentence structure, grammar, and other aspects of answers can be evaluated, such as by semantic analysis, grammatical analysis, and so forth, and the dialog rated based on ratings in those areas. Algorithms for evaluating sentence structure, semantic analysis and so forth are known in the industry.

The rankings by each of these rankings can stand alone and one selected as a primary ranking with other rankings acting as a tie breaker. Additionally, or alternatively, the various rankings can be combined into a single ranking, such as through a machine learning algorithm or other combinatorial mechanism (e.g., weighted sum, etc.). In one aspect, the bots are ranked according to various criteria and a machine learning algorithm is used to produce an overall ranking. One or more supervised or unsupervised machine learning processes, such as a support vector machine (SVM) technique, a convolutional neural network, a deep neural network, decision tree process, k nearest neighbor process, kernel density estimation, K-means clustering, expectation maximization, and so forth can be used to combine the rankings into an overall ranking. These individual machine learning processes each have training processes (supervised or unsupervised). Initial training can be accomplished either by starting with a "standard" model that adapts over time to be personalized or by using a batch of collected data for initial training.

Once responses are ranked by the response ranking process 320, the ranked replies are sent to the response selection process 324. The response selection process 324 selects the top k responses based on the ranking and/or, in some embodiments, other criteria. The number of responses, k, that are selected can be based on a variety of criteria, such as screen real estate, communication bandwidth, the number of responses a user is likely to look through before either selecting a result or abandoning the search, and so forth.

Prior to selecting the top k responses, the response selection process 324 can apply filters 326, in some embodiments. An examples of a filter that can be applied is a filter that removes offensive responses. This filter can be created by keeping a list of stop words that are offensive and removing responses that include the stop words. Semantic analysis is another approach to removing offensive responses that can be applied. In this approach, the responses are subject to semantic analysis to extract meaning from the responses and when the meaning falls into categories that are considered offensive, the response can be removed. Another example of a filter is a filter that removes non-grammatical or otherwise nonsensical responses. To implement this filter, responses can be subject to grammatical analysis and any responses that do not comply with a set of grammar rules or, equivalently, that comply with a set of non-grammatical rules, can be removed. For example, when responses are intended to be natural language like, responses that do not sound natural can be removed. Natural language responses typically comply with standard grammar rules such as having a verb, not ending with a conjunction, preposition, article, and so forth. Thus, grammatical analysis can be applied and rules that do not comply with the grammar can be removed.

In the response selection process 324, the answers from bots can be passed to other bots and answers from those bots (in response to the answers passed to them) can be collected. This is represented by the arrow running from response selection process 324 to bot response process 312. Additionally, or alternatively, the answers from one bot can be passed to others by a different process in the diagram.

Once the top k responses are selected, there can be a final selection process which selects responses based on other criteria, such as limiting the number of fused responses that are presented by the broker bot and/or other bots that are displayed, and so forth. This final selection process can be the process that identifies which bots are to be uncovered, which are fused and so forth.

The final responses are presented to the broker 304, which causes display of the answer to the user.

Figure 4:
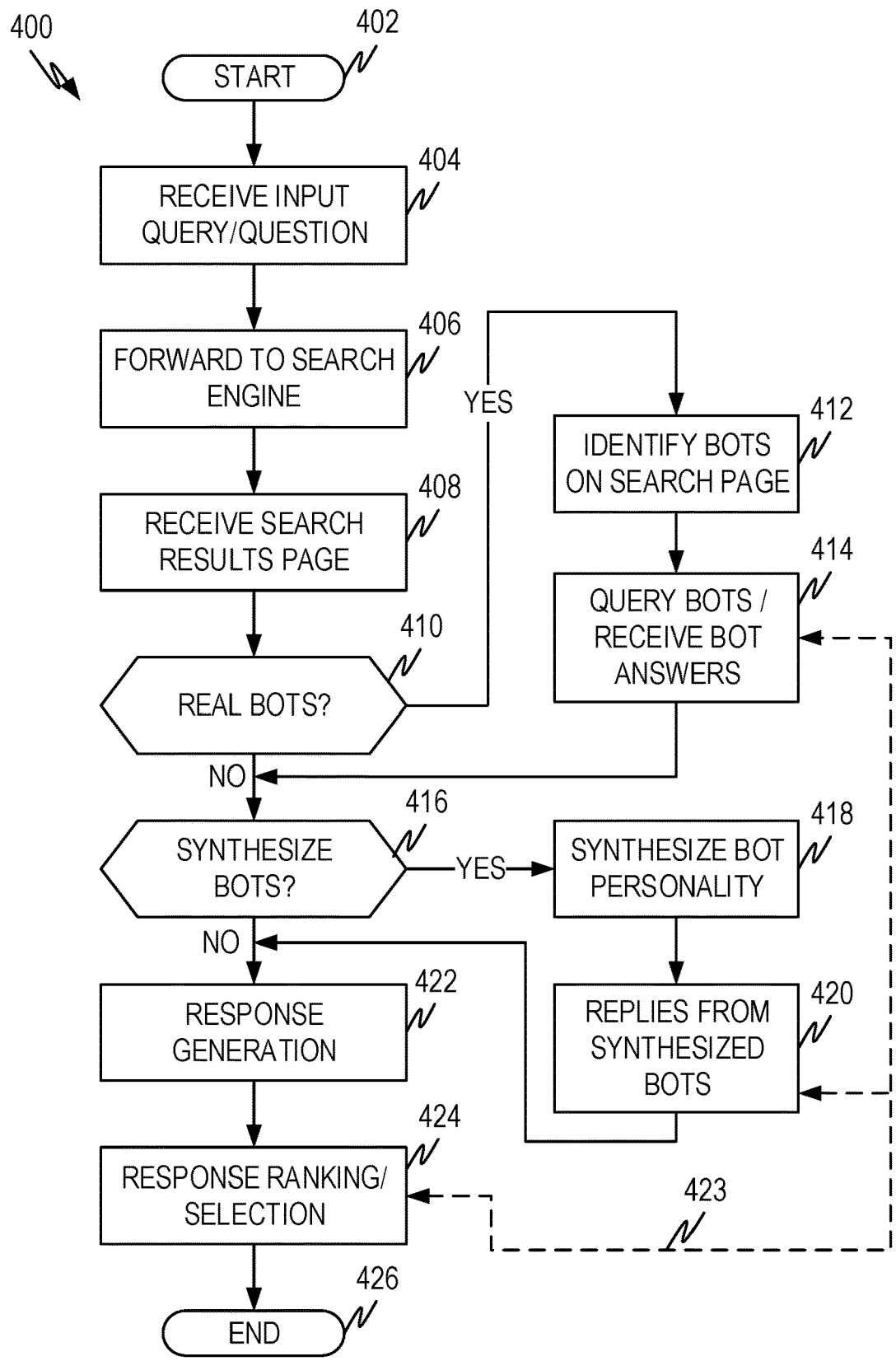
FIG. 4 illustrates a flow diagram for interacting with multiple bots according to some aspects of the current disclosure.

FIG. 4 illustrates a flow diagram 400 for interacting with multiple bots according to some aspects of the current disclosure. This flow diagram 400 provides greater detail on how an architecture such as that presented in FIG. 3 operates.

The process begins at operation 402 and proceeds to operation 404 where user input is received. This input is a query/question from the user as previously described. Operation 406 forwards the query to the search engine and results are received from the search engine in operation 408.

Operation 410 identifies whether bots are provided by the various domains represented in the search results. This process is explained in greater detail in conjunction with FIG. 5 below. If bots are provided, then the "YES" branch is taken to operation 412 where the various search bots are enumerated. The query is passed to the identified bots and the bot answers are received (operation 414).

If no bots are provided or after the answers from the provided bots are received, operation 416 identifies whether bots should be synthesized for search results where a bot is not provided. This process is described in greater detail in conjunction with FIG. 8 below. In summary, however, a decision to synthesize a bot can be made based on different criteria. In one example, the domain can provide an indicator as to whether it would like a bot to be synthesized on its behalf. Domain providers are often careful to control the way their company, etc. are presented to the public and may not want the broker to synthesize a bot that may give a different impression than the one the provider desires to convey.

As another example, a decision on whether to synthesize a bot for a search result may depend on whether the domain provides sufficient information to synthesize a bot. In one aspect, a general chat bot index can be combined with specific information to provide a chat bot. A general chat bot index may have information to help a chat bot form proper replies (i.e., that are conversational in nature) if the underlying factual information can be provided and, in some instances, if sufficient information can be obtained to identify/derive a personality for the resultant synthesized bot. Underlying factual information can be obtained, for example by extracting facts from the web pages, etc. provided in the search results. However, if sufficient factual information cannot be extracted, then a chat bot may not be able to be synthesized. Additionally, or alternatively, a personality can be developed for those bots that present a personality, by looking at information provided by the domain or by individuals that work for the provided, such as by evaluating customer service replies, blog posts, and other such material where the "personality" of the provider can be ascertained. Such personality and factual information may be combined in an index which can be utilized in conjunction with the general chat bot index to synthesize a bot.

In the context of this disclosure an index is a database having a structure that allows the appropriate information to be identified and extracted. Often indexes not only contain information but also identify where additional information can be located, such as the website, file location, and so forth that are the source for the information in the index. Thus, a chat bot index may not only have information to drive a chat bot index, but may also reference additional information outside the index that can be used in crafting answers.

As another example, a decision on whether to synthesize a bot for a search result can depend on whether the domain provides a chat bot index. If a domain provider does not want to go to the work to create and maintain its own chat bot, the domain provider can rely on the broker to synthesize a bot for it. By providing the fact/personality indexes needed by the system to combine with the general chat bot index, the domain provider can not only control how the chat bot behaves and the responses given and/or the personality of the chat bot (for those bots that implement a personality), they can provide a chat bot service to their customers and others that visit their site without having to develop and maintain their own bot. When the system identifies that a domain has provided the appropriate indexes, the system can be assured that the domain desires the system to synthesize a bot for it using the provided information. Assuming the indexes are sufficient, are in the proper format, etc. the system can then synthesize the bot.

Operation 418 synthesizes the bot using the indexes when the decision is made to synthesize a bot. The process of synthesizing a bot is the same as providing a chat bot, combining the obtained/derived indexes with the general chat bot index. Operation 420 receives the replies from the synthesized bots.

All replies are passed to the response generation process 422 where fused responses are created for those responses that should be the basis for fused responses as discussed herein. As discussed herein, only a subset of responses may be utilized for fused responses or no responses at all may be fused, depending on the specific embodiment and situation.

Operation 424 ranks and selects the responses to be displayed as previously discussed. The dashed line between operation 424 and operation 414 and operation 420 represent the passing of answers from one bot to the other bots so that all bots can submit further answer(s) in reply to the answer from the bot. Some embodiments may allow all bots (synthesized and provided) to participate in this group bot dialog while others may only allow provided bots or synthesized bots to participate. The broker bot is also included.

The process ends at operation 426.

Figure 5:
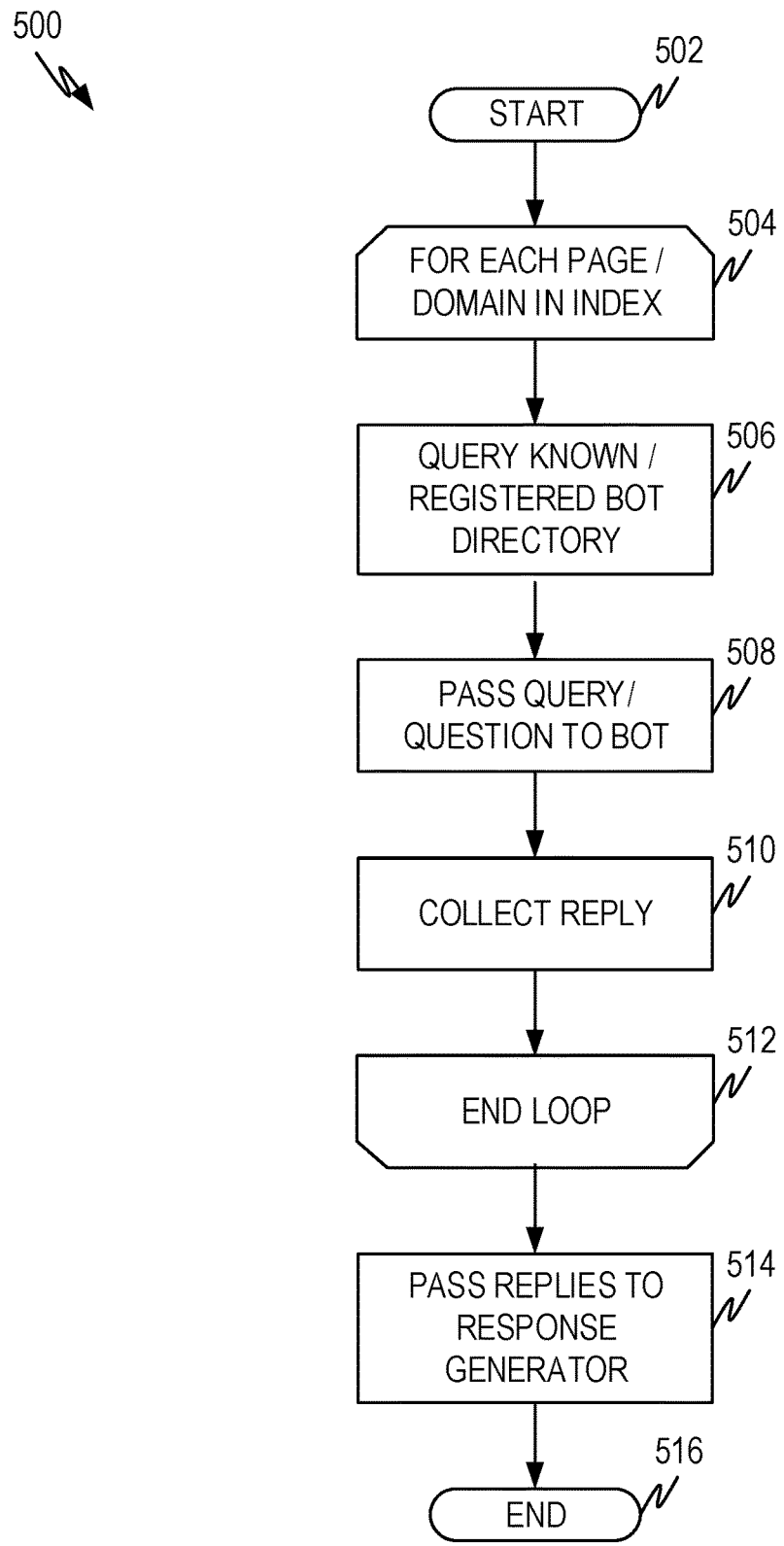
FIG. 5 illustrates a flow diagram for obtaining answers from multiple bots according to some aspects of the current disclosure.

FIG. 5 illustrates a flow diagram 500 for obtaining answers from multiple bots according to some aspects of the current disclosure. This process, for example, represents how provided bots are identified and answers obtained in some embodiments.

The process begins at operation 502 and proceeds to operation 504, which begins a loop to loop over all the pages (i.e., search results) and/or domains in the search results.

Operation 506 queries a known or registered bot directory. When the search engine creates its index, such as through crawling information placed on the internet, bots that are provided by a domain may be discovered. The presence of these bots can be placed in a directory/database along with the associated domain, web address, location, etc. Thus, bots are "known" through such a discovery process. Additionally, or alternatively, the system can provide a registration mechanism where domains that provide bots can register them so that they become known to the system. As yet another example, the search results can be probed to identify whether a bot exists and if so, the information stored in the directory/database.

The information stored in the directory/database allows the system to know how to contact the bot, provide input to and receive answers from the bot. This is represented in FIG. 5 by operations 508 (passing the query to the bot) and operation 510 (receiving the reply). Operation 510 also collects the replies for all bots as execution loops over all the bots. Thus, replies from all the bots are collected and stored in an appropriate location and/or data structure.

Operation 512 represents the end of the loop and once the system has looped over all the search results, the replies are passed to the response generator as indicated in operation 514 and as discussed elsewhere. Execution ends at operation 516.

Figure 6:
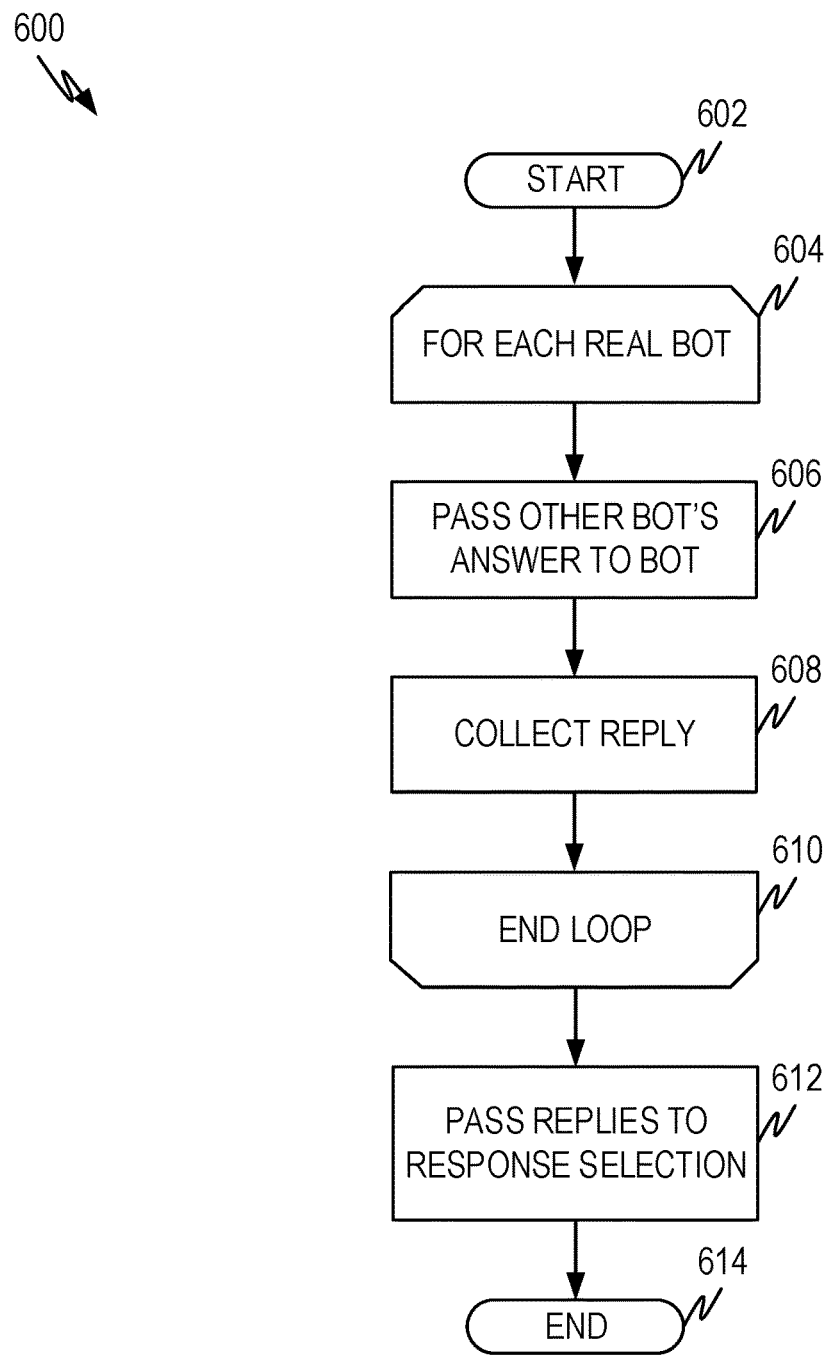
FIG. 6 illustrates a flow diagram for exchanging answers between multiple bots according to some aspects of the current disclosure.

FIG. 6 illustrates a flow diagram 600 for exchanging answers between multiple bots according to some aspects of the current disclosure. In this diagram, the example of real (e.g., provided not synthesized bots) are used, although in some embodiments synthesized bots can also be included.

As discussed herein, one aspect of the disclosure is that chat bots can not only talk to the user, but can be engaged in a group conversation where they can answer other chat bots. For example, if a user is asking about something and one chat bot provides an answer, the other chat bots can respond to that answer if there is additional or corrected information that they would like to provide. For example, if the user asked Bot1 a question, other bots could provide additional information:

User: When was the Brooklyn Bridge completed?
Bot1: The Brooklyn Bridge was completed in 1833.
Bot2: On May 24, to be exact.
Bot3: Did you know "Boss" Tweed facilitated $65,000 in bribes so the builder could get a $1.5 million bond issued?

The process begins at operation 602 and proceeds to operation 604 where the loop across all relevant bots (in this case real bots) is begin. The loop is across the bots that have not provided an answer. Thus, in the above example where the user asks the question to Bot1, the loop would be across Bot2 and Bot3. Note that prior to the flow diagram in FIG. 6 all bots would have had the original question from the user passed to them so that all bots know the original question asked to, for example, Bot1.

Operation 606 takes the answer from one bot (e.g., Bot1 in the example above) and passes the answer to the bot under consideration, in this example Bot2 or Bot3, depending on which iteration of the loop is being performed. Thus, the bot under consideration would have the response "The Brooklyn Bridge was completed in 1833" sent to them. Thus, the bot under consideration knows the original question and the answer provided by the bot. From this information, the bot may decide to provide additional information. For example, if Bot2's response to the original question was May 24, 1833, the bot may provide the additional information to the user in the form of an answer (e.g., "On May 24 to be exact").

Operation 608 collects the responses from the bot, stores the response in an appropriate database, data structure, location etc. and operation 610 loops over the remaining bots.

Once all the responses have been collected (i.e., the loop is complete), the collected responses can be passed to the appropriate process that initiated execution of the loop. In the representative embodiment of FIGS. 3-4 this would be the response selection process. Thus, operation 612 returns the replies to the response selection process. In a different embodiment, if a different process initiated the passing of one bot's response to other bots, the replies would be returned to that process instead.

The process ends at operation 614.

Figure 7:
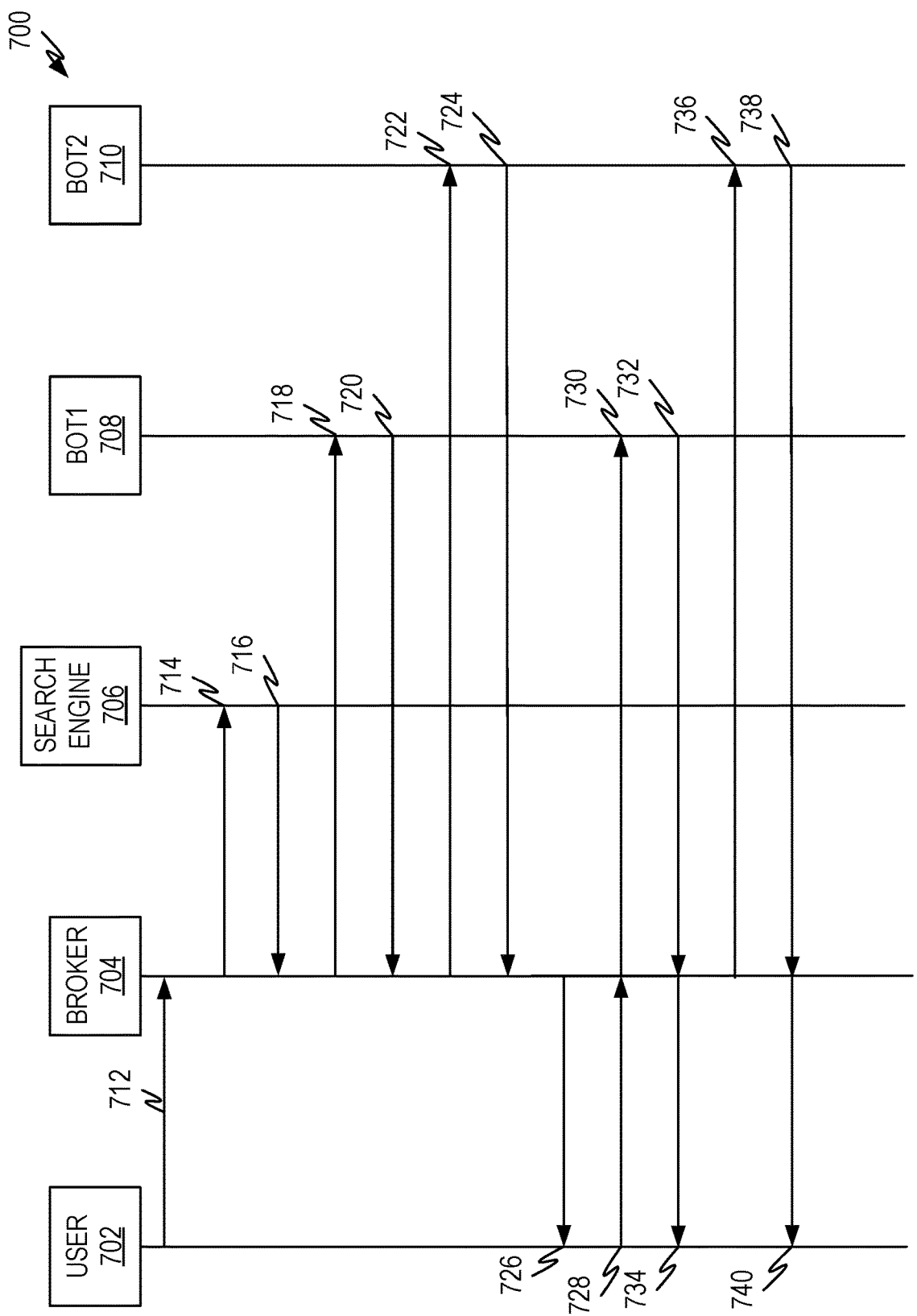
FIG. 7 illustrates a communication exchange diagram for exchanging answers between multiple bots according to some aspects of the current disclosure.

FIG. 7 illustrates a communication exchange diagram 700 for exchanging answers between multiple bots according to some aspects of the current disclosure. This diagram illustrates in greater detail how communication flow between different components of the system work together to provide answers to the user.

In exchange 712, the user 702 provides a query to the broker 704. The broker 704 forwards the query to the search engine 706 in exchange 714. The search engine 706 returns the search results (exchange 716) and the broker 704 enumerates the bots in the search results and/or synthesizes bots as described herein. In this example, the broker 704 enumerates Bot1 708 and Bot2 710.

The broker 704 forwards the original query to both the enumerated bots and receives their replies (i.e., exchanges 718, 720, 722 and 724). Once the replies are received, the broker ranks and selects responses as previously described. The resultant replies, in this instance including the replies from Bot1 and Bot2, are returned and displayed to the user 702 (exchange 726).

Suppose the user 702 chooses to interact with Bot1, the user 702 provides input (e.g., a query and/or question) to Bot1 through the broker 704 as indicated by exchange 728, which contains the user's input. The broker 704 forwards the input to Bot1 as indicated by exchange 730. Bot1 replies (exchange 732), which is forwarded back to the user (exchange 734).

In addition, the reply from Bot1 (exchange 734) is forwarded to Bot2 (exchange 736) and Bot2 can provide any comment/answer based on Bot1's answer (exchange 738). Bot2's answer is displayed to the user 702 (exchange 740).

In a variation of the above exchange sequence, the broker 704 may not forward Bot1's reply to the user until all replies to Bot1's reply are received. In this alternative sequence exchange 734 would not exist and exchange 740 would contain all the replies from all bots that were selected for display (i.e., by ranking and selection processes).

Figure 8:
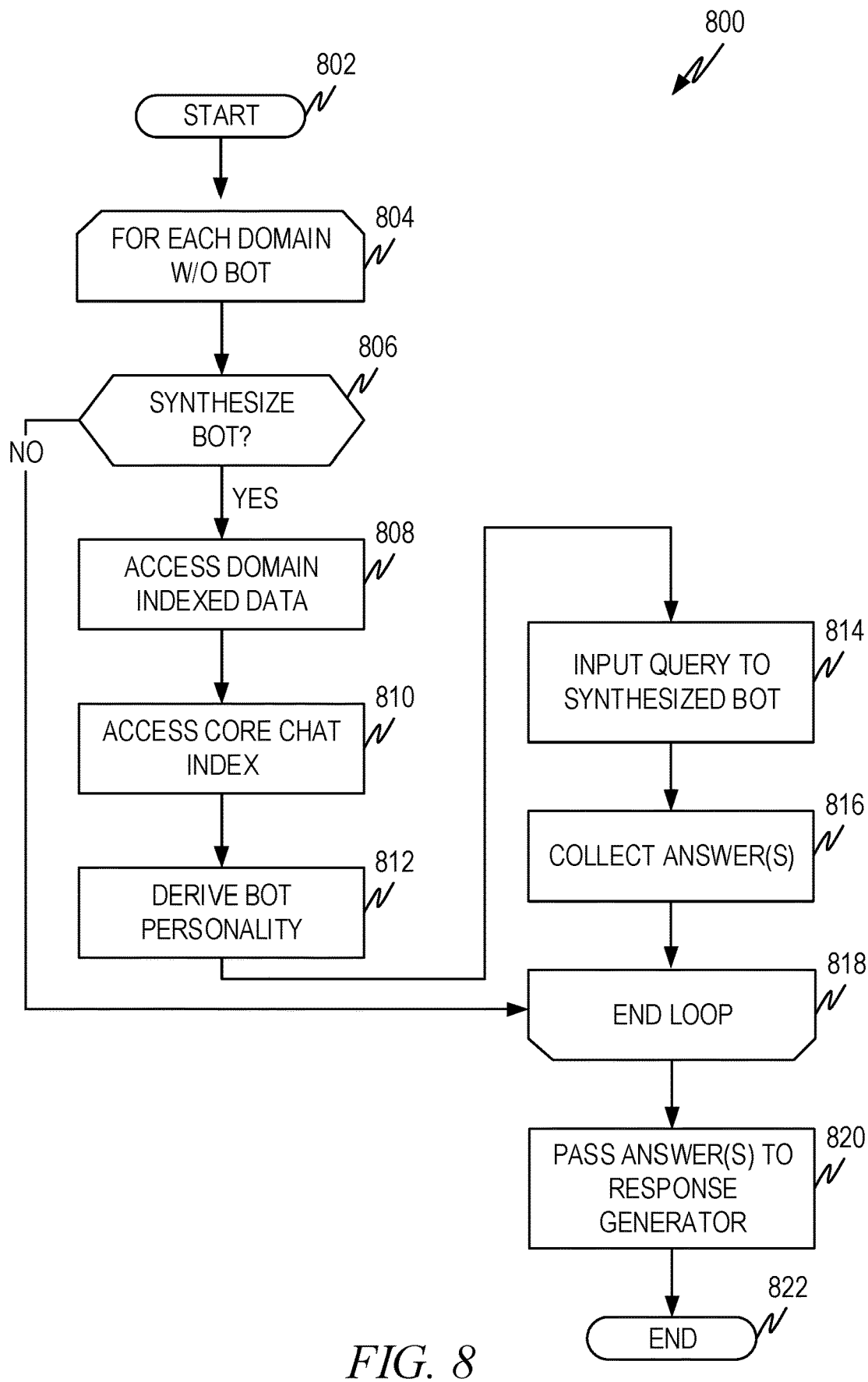
FIG. 8 illustrates a flow diagram for synthesizing bots and answers according to some aspects of the current disclosure.

FIG. 8 illustrates a flow diagram 800 for synthesizing bots and answers according to some aspects of the current disclosure. The process begins at operation 802 and proceeds to operation 804 which begins a loop across all domains/search results where a bot has not been provided (e.g., those domains where a bot cannot be determined, such as by the process indicated in FIG. 5).

In operation 806 a decision is made as to whether to synthesize a bot for the domain or not. As discussed above, the decision can be made based on various criteria. These include a decision not to synthesize a bot because the domain prefers a bot not be synthesized, a decision not to synthesize a bot because insufficient information exists to synthesize a bot, or for some other reason.

If a domain does not want a bot synthesized, the decision can be conveyed in a variety of ways either explicitly or implicitly. For example, websites provide a robots.txt file that identifies portions of the website that should not be crawled by a web crawler. A similar mechanism can be used to tell a broker that a bot should not be synthesized for the site. As another example, metadata in website HTTP headers or other metadata can be used to convey a do not synthesize decision to the broker. Other ways can be used for the domain to signify a do not synthesize decision to the broker.

As explained above, another reason the system may decide not to synthesize a bot is because insufficient information exists to synthesize a bot.

On the other hand, the domain may convey a please synthesize a bot desire to the system in a variety of ways. As explained above, one way is for the domain to provide sufficient information while not asking the system to not synthesize a bot. Another way is to specifically provide the indexes needed to synthesize a bot. In yet another example, a registry can be kept (like the bot registry previously described) where domains can register their desire to have a bot (or not to have a bot) synthesized.

If the decision is to synthesize a bot, execution proceeds to operation 808. If the decision is not to synthesize a bot, execution proceeds to operation 818 which is the end of the loop and the next domain (if any) is selected and execution returns to operation 806.

Operation 808 accesses the domain indexed data. This can include either the specific indexes needed to derive a bot as previously described or can be an index created by evaluating the content on the domain as previously described. Operation 810 then accesses the core chat index as previously described. Together (along with any personality information derived as part of operation 812) these indexes allow the system to synthesize a bot for the domain. The act of synthesizing a bot is providing the appropriate indexes (e.g., core chat bot index, domain index and/or personality index) to the chat bot model. There are numerous chat bot models known and any can be used to synthesize the bot for the domain.

Operation 812 derives any personality information needed to create the chat bot. Not all chat bot models utilize personality information. One chat bot that does utilize personality information is Xaioice™ or Xiao Bing® chat bot provided by Microsoft Corp. Personality information can be derived by looking at "official" information provided by a domain. Such information may be a blog, a response from the company in a forum, the tone of articles and other information on the domain, and so forth.

The "personality" of this type of information can be derived, for example, by extracting key words and phrases and then subjecting them to semantic analysis to extract meaning and/or tone. Another way that the emotion can be extracted is to use an analysis methodology, such as Word2Vec, Gensim, Latent Dirichlet Allocation (LDA), tensor flow or other such models/tools. The semantic analysis of these models can find similarities among words by creating a vector, such that words with similar meanings have vectors near each other.

These models are shallow, two-layer neural networks that are trained to reconstruct linguistic contexts of words. Word2vec takes as input a large corpus of text and produces a high-dimensional space (typically between a hundred and several hundred dimensions). Each unique word in the corpus is assigned a corresponding vector in the space. The vectors are positioned in the vector space such that words that share common contexts in the corpus are located in close proximity to one another in the space. In one example embodiment, each element of the vector is a real number.

For example, Word2vec may be utilized to identify the similarity between two words. When the words/phrases extracted from the domain are subject to this type of analysis, the similarities in the extracted words/phrases are identified, for example by the location assigned to the words. Furthermore, the number of words that are similar can be evaluated to identify groups of words/phrases that are similar and from which a personality can be identified. For example, once a cluster of words is identified, the similarity in the meaning of the words can be used to extract a personality. Thus, if the clusters tend to be associated with a type of slang, a manner of speaking, or so forth, that can be used to identify the personality of the chat bot. Weights can be derived by the size of the clusters and so forth to allow a personality to be selected.

Once the chat bot has been synthesized, the query is input into the bot and an answer is received (operation 814). The answer(s) is stored in an appropriate database, data structure and/or so forth (operation 816) so that the collection of answers can be returned to the calling process.

Operation 818 closes the loop. Operation 820 returns the collected answers from the synthesized bots to the calling process, which in the example of FIGS. 3 and 4 is the response generator process, but which could be different in different embodiments.

The process ends at operation 822.

Figure 9:
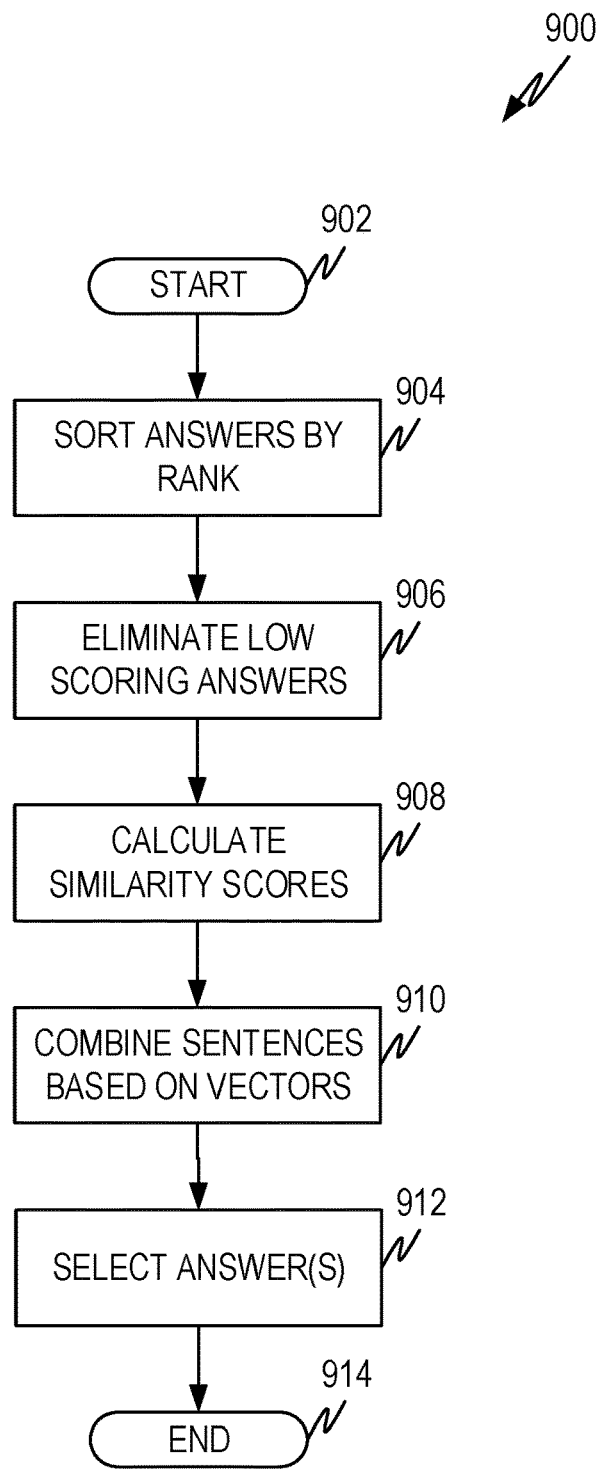
FIG. 9 illustrates a flow diagram for fusing responses according to some aspects of the current disclosure.

FIG. 9 illustrates a flow diagram 900 for fusing responses according to some aspects of the current disclosure. The process can be used, for example, when covered bots answers are fused by a broker bot. The fusion process of FIG. 9 can be used to produce a single fused answer or multiple fused answers, depending on how it is applied.

The process begins at operation 902 and proceeds to 904 where the answers are ranked according to one or more ranking criteria. This can be performed as explained above in any of the descriptions about ranking responses and/or results and the details need not be repeated again here.

Once the answers are ranked, it may be desirable to eliminate answers that should not be considered for fusion for one reason or another. For example, operation 906 eliminates answers that fall below a ranking threshold. This eliminates low quality results that would otherwise drag the quality of the fused answer(s) down.

The answers that remain after eliminating any low quality answers can be treated as vectors of words. As described above, models such as Word2Vec, Gensim, Latent Dirichlet Allocation (LDA), tensor flow or other such models/tools. The semantic analysis of these models can find similarities among words of the vectors, such that words with similar meanings have vectors near each other. By applying a methodology to these models such as described above, the location in vector space can be used to calculate one or more similarity scores (operation 908) based on distance to other vectors. Thus, the similarity score can represent how close or far vectors are in the resultant vector space.

The similarity score can be used to identify words and phrases that are candidates for fusion into a combined sentence (operation 910). In practice, a threshold is typically set and scores that are within the threshold will be considered for combination. This results in words/phrases in a local region of a size determined by the threshold being candidates for combination while words/phrases that lay outside the local region are not considered for combination.

Operation 912 selects the desired fused answers. This can be performed as previously described by ranking and then selecting fused answers. For example, as described in conjunction with response ranking process 320 and response selection process 324. Other ranking and selection processes described herein can also be used.

Processing ends at operation 914.

Example Machine Architecture and Machine-Readable Medium

Figure 10:
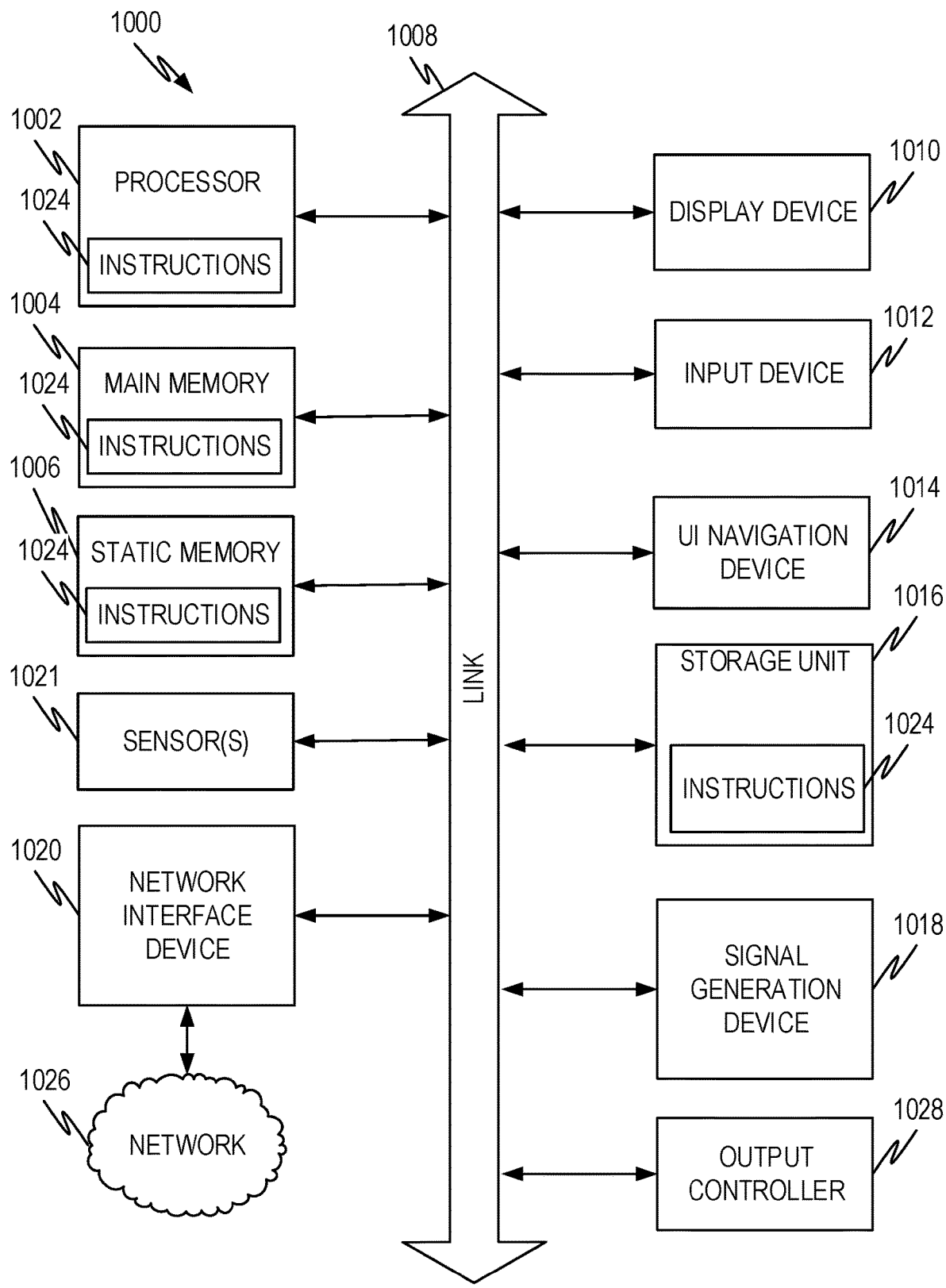
FIG. 10 illustrates a representative machine architecture suitable for implementing the systems and other aspects disclosed herein or for executing the methods disclosed herein.

FIG. 10 illustrates a representative machine architecture suitable for implementing the systems and so forth or for executing the methods disclosed herein. The machine of FIG. 10 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 10 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1000 includes at least one processor 1002 (e.g., a central processing unit (CPU), a graphics processing unit (GPU), advanced processing unit (APU), or combinations thereof), one or more memories such as a main memory 1004, a static memory 1006, or other types of memory, which communicate with each other via link 1008. Link 1008 may be a bus or other type of connection channel. The machine 1000 may include further optional aspects such as a graphics display unit 1010 comprising any type of display. The machine 1000 may also include other optional aspects such as an alphanumeric input device 1012 (e.g., a keyboard, touch screen, and so forth), a user interface (UI) navigation device 1014 (e.g., a mouse, trackball, touch device, and so forth), a storage unit 1016 (e.g., disk drive or other storage device(s)), a signal generation device 1018 (e.g., a speaker), sensor(s) 1021 (e.g., global positioning sensor, accelerometer(s), microphone(s), camera(s), and so forth), output controller 1028 (e.g., wired or wireless connection to connect and/or communicate with one or more other devices such as a universal serial bus (USB), near field communication (NFC), infrared (IR), serial/parallel bus, etc.), and a network interface device 1020 (e.g., wired and/or wireless) to connect to and/or communicate over one or more networks 1026.

Executable Instructions and Machine-Storage Medium

The various memories (i.e., 1004, 1006, and/or memory of the processor(s) 1002) and/or storage unit 1016 may store one or more sets of instructions and data structures (e.g., software) 1024 embodying or utilized by any one or more of the methodologies or functions described herein. These instructions, when executed by processor(s) 1002 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, and other such media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A method for chat bot discovery, comprising:
receiving a search result page from a search engine, the results page comprising a plurality of search results;
identifying a chat bot for each result of a subset of the search results;
causing presentation of a user interface comprising:
a portion of the search results, at least one result including an identified chat bot; and a broker bot interface associated with a broker bot, the interface allowing a user to interact with the broker bot;

receiving information from the user via the broker bot interface;

passing the information to the broker bot and the identified chat bot; and receiving responses from both the broker bot and the identified chat bot.

Example 2

The method of example 1 wherein the user interface further comprises:

an indication the at least one result includes the identified chat bot.

Example 3

The method of example 2 wherein the indication comprises either:

a chat bot interface allowing the user to interact with the identified chat bot; or a control which the user can activate to expose the chat bot interface allowing the user to interact with the identified chat bot.

Example 4

The method of example 1 wherein the portion of the search results includes a plurality of results with identified chat bots and wherein the information is passed to the broker bot and all identified chat bots.

Example 5

The method of example 1 further comprising:

fusing the response from the broker bot and the identified chat bot and presenting the fused response to the user via the broker bot interface.

Example 6

The method of example 1, 2, 3, 4, or 5 wherein:

the portion of the search results includes a plurality of results with identified chat bots;

the user interface comprises a chat bot interface for each of the identified chat bots that allows the user to interact with the chat bot associated with the chat bot interface.

Example 7

The method of example 6 further comprising:

receiving information via a first of the chat bot interfaces and passing the information to the associated chat bot and all other identified chat bots;

receiving a reply from the associated chat bot; and passing the reply to all other identified chat bots.

Example 8

The method of example 6 further comprising:

receiving information via a first of the chat bot interfaces and passing the information to the associated chat bot and all other identified chat bots;

receiving a reply from the associated chat bot and from all identified chat bots;

fusing a subset of the received replies into a fused reply; and presenting the fused reply to the user.

Example 9

The method of example 8 wherein the fused reply is presented via the broker bot interface.

Example 10

A system for chat bot discovery comprising a processor and computer executable instructions, that when executed by the processor, cause the system to perform operations comprising:

receiving a search result page from a search engine, the results page comprising a plurality of search results;

identifying a chat bot for each result of a subset of the search results;

causing presentation of a user interface comprising:

a portion of the search results, at least one result including an identified chat bot; and a broker bot interface associated with a broker bot, the interface allowing a user to interact with the broker bot;

receiving information from the user via the broker bot interface;

passing the information to the broker bot and the identified chat bot; and receiving responses from both the broker bot and the identified chat bot.

Example 11

The system of example 10 wherein the user interface further comprises:

an indication the at least one result includes the identified chat bot.

Example 12

The system of example 11 wherein the indication comprises either:

a chat bot interface allowing the user to interact with the identified chat bot; or a control which the user can activate to expose the chat bot interface allowing the user to interact with the identified chat bot.

Example 13

The system of example 10 wherein the portion of the search results includes a plurality of results with identified chat bots and wherein the information is passed to the broker bot and all identified chat bots.

Example 14

The system of example 10 further comprising:

fusing the response from the broker bot and the identified chat bot and presenting the fused response to the user via the broker bot interface.

Example 15

The system of example 10, 11, 12, 13 or 14 wherein:

the portion of the search results includes a plurality of results with identified chat bots;

the user interface comprises a chat bot interface for each of the identified chat bots that allows the user to interact with the chat bot associated with the chat bot interface.

Example 16

The system of example 15 further comprising:
receiving information via a first of the chat bot interfaces and passing the information to the associated chat bot and all other identified chat bots;
receiving a reply from the associated chat bot; and
passing the reply to all other identified chat bots.

Example 17

The system of example 15 further comprising:
receiving information via a first of the chat bot interfaces and passing the information to the associated chat bot and all other identified chat bots;
receiving a reply from the associated chat bot and from all identified chat bots;
fusing a subset of the received replies into a fused reply; and
presenting the fused reply to the user.

Example 18

The system of example 17 wherein the fused reply is presented via the broker bot interface.

Example 19

A computer storage medium comprising executable instructions that, when executed by a processor of a machine, cause the machine to perform operations comprising:
receiving a search result page from a search engine, the results page comprising a plurality of search results;
identifying a chat bot for each result of a subset of the search results;
causing presentation of a user interface comprising:
a portion of the search results, at least one result including an identified chat bot; and
a broker bot interface associated with a broker bot, the interface allowing a user to interact with the broker bot;
receiving information from the user via the broker bot interface;
passing the information to the broker bot and the identified chat bot; and
receiving responses from both the broker bot and the identified chat bot.

Example 20

The medium of example 19 further comprising synthesizing a chat bot for a search result that does not have an associated chat bot.

Example 21

A method for chat bot discovery, comprising:
receiving a search result page from a search engine, the results page comprising a plurality of search results (408);
identifying a subset of the search results each having an associated chat bot (410, 412);
identifying a broker bot (312);

receiving information from a user to be passed to the broker bot;
passing the information to the broker bot and to the associated chat bots (312, 316, 414, 420);
receiving responses from the broker bot and from the associated chat bots (312, 316, 414, 420);
generate a fused response comprising information from a subset of the responses (318, 320, 324, 422);
present the fused response to the user.

Example 22

The method of example 21 further comprising presenting to the user an indication for search results that have an associated chat bot.

Example 23

The method of example 22 wherein the indication comprises either:
a chat bot interface allowing the user to interact with the identified chat bot; or
a control which the user can activate to expose the chat bot interface allowing the user to interact with the identified chat bot.

Example 24

The method of example 21, 22, or 23 wherein the subset comprises a plurality of results with identified chat bots.

Example 25

The method of example 21, 22, 23, or 24 further comprising:
identifying a search result that does not have an associated chat bot; and
creating a synthesized chat bot based on information from a domain associated with the search result; and
associating the synthesized chat bot with the search result.

Example 26

The method of example 21, 22, 23, 24, or 25 wherein identifying a subset of the search results each having an associated chat bot comprises querying a known or registered bot directory.

Example 27

The method of example 26 further comprising:
receiving information for a first of the chat bots and passing the information to the first chat bot and all other identified chat bots;
receiving a reply from the first chat bot; and
passing the reply to all other identified chat bots.

Example 28

The method of example 26 further comprising:
receiving information for a first of the chat bots and passing the information to the first chat bot and all other identified chat bots;
receiving a reply from the first chat bot; and
passing the reply to all other identified chat bots;
receiving a reply from all other identified chat bots; and
presenting the replies to the user.

Example 29

The method of example 21, 22, 23, 24, 25, 26, 27, or 28 wherein the fused reply is presented via the broker bot interface.

Example 30

The method of example 21, 22, 23, 24, 25, 26, 27, 28, or 29 further comprising:
identifying a search result that does not have an associated chat bot; and
synthesizing a bot personality based on information from a domain associated with the search result;
creating a synthesized chat bot based on the bot personality; and
associating the synthesized chat bot with the search result.

Example 31

The method of example 21, 22, 23, 24, 25, 26, 27, 28, 29, or 30 wherein the fused response is generated from a combination of real chat bots and synthesized chat bots.

Example 32

The method of example 21, 22, 23, 24, 25, 26, 27, 28, 29, 30, or 31 wherein response generation comprises:
ranking the responses from each bot according to a specified criteria;
selecting a subset of the ranked responses as the basis for the generated response; and
generating the fused response based on information in the subset of the ranked responses.

Example 33

The method of example 21, 22, 23, 24, 25, 26, 27, 28, 29, 30, 31 or 32 further comprising passing each bot reply to other bots.

Example 34

An apparatus comprising means to perform a method as in any preceding example.

Example 35

Machine-readable storage including machine-readable instructions, when executed, to implement a method or realize an apparatus as in any preceding example.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:

1. A system for chat bot discovery comprising a processor and computer executable instructions, that when executed by the processor, cause the system to perform operations comprising:
receiving a plurality of search results from a search engine based on a submitted user query;
identifying a chat bot for each result of a subset of the search results;
prior to presenting search results, submitting the user query to a subset of the identified chat bots;
receiving an answer to the query from subset of the identified chat bots;
select a subset of the answers based on one or more selection criterion;
causing presentation of a user interface comprising:
a portion of the search results, at least one result including an identified chat bot;
the subset of the answers; and
a broker bot interface associated with a broker bot, the interface allowing a user to interact with the broker bot.

2. The system of claim 1 wherein:
the portion of the search results includes a plurality of results with identified chat bots;
the user interface comprises a chat bot interface for each of the identified chat bots that allows the user to interact with the chat bot associated with the chat bot interface.

3. The system of claim 2 further comprising:
receiving information via a first of the chat bot interfaces and passing the information to the associated chat bot and all other identified chat bots;
receiving a reply from the associated chat bot and from all identified chat bots;
fusing a subset of the received replies into a fused reply; and
presenting the fused reply to the user.

4. The system of claim 3 wherein the fused reply is presented via the broker bot interface.

5. The system of claim 2 further comprising:
receiving information via a first of the chat bot interfaces and passing the information to the associated chat bot and all other identified chat bots;
receiving a reply from the associated chat bot; and
passing the reply to all other identified chat bots.

6. The system of claim 1 wherein the user interface further comprises:
an indication the at least one result includes the identified chat bot.

7. The system of claim 6 wherein the indication comprises either:
a chat bot interface allowing the user to interact with the identified chat bot; or
a control which the user can activate to expose the chat bot interface allowing the user to interact with the identified chat bot.

8. The system of claim 1 wherein the portion of the search results includes a plurality of results with identified chat bots and wherein operations further comprise:
receiving information from the user via the broker bot interface; and
passing the information to the broker bot and all identified chat bots.

9. The system of claim 1 wherein the subset of the answers comprises an answer created by fusing individual responses from a plurality of bots into a single answer.

10. A method for chat bot discovery, comprising:
receiving a plurality of search results from a search engine;
identifying subset of the plurality of search results, each result of the subset having an associated chat bot;

causing presentation of a user interface comprising:
   a result of the subset;
   a mechanism allowing a user to interact with the chat bot associated with the result, the mechanism comprising:
      a control, activation of which displays a chat bot user interface within the user interface;
      the chat bot user interface within the user interface; or
      both; and
   a broker bot interface associated with a broker bot not included with or coming from the search results, the broker bot interface allowing the user to interact with the broker bot;
receiving information from the user via the broker bot interface;
passing the information to the broker bot and the chat bot associated with the result; and
receiving responses from both the broker bot and the chat bot associated with the result.

11. The method of claim 10 wherein the user interface further comprises a plurality of results from the subset, each having a chat bot interface such that a plurality of chat bot interfaces are displayed within the user interface, each allowing interaction with a different chat bot, and wherein the method further comprises:
   receiving information via a first chat bot interface and passing the information to a chat bot associated with the first chat bot interface and all other chat bots;
   receiving a reply from the chat bot associated with the first chat bot interface and from all other chat bots;
   fusing a subset of the received replies into a fused reply; and
   presenting the fused reply to the user.

12. The method of claim 11 wherein the fused reply is presented via the broker bot interface.

13. The method of claim 10 wherein the user interface further comprises a plurality of results with associated chat bots and wherein the information is passed to the broker bot and all associated chat bots.

14. The method of claim 10 further comprising:
   fusing the response from the broker bot and the chat bot and presenting the fused response to the user via the broker bot interface.

15. The method of claim 10 wherein the user interface further comprises a portion of the search results without associated chat bots.

16. The method of claim 10 wherein the user interface further comprises a plurality of results from the subset, each having a chat bot interface such that a plurality of chat bot interfaces are displayed within the user interface, each allowing interaction with a different chat bot, and wherein the method further comprises:
   receiving information via a first chat bot interface and passing the information to a chat bot associated with the first chat bot interface and all other chat bots;
   receiving a reply from the chat bot associated with the first chat bot interface; and
   passing the reply to all other chat bots.

17. A computer storage medium comprising executable instructions that, when executed by a processor of a machine, cause the machine to perform operations comprising:
   receiving a search result page from a search engine, the results page comprising a plurality of search results;
   for each search result, checking a known bot directory that comprises bots associated with a particular search result thus identifying a subset of search results that have associated bots;
   causing presentation of a user interface comprising:
      a portion of the search results, at least one result including an associated chat bot;
      an indication for each of the at least one result presented in proximity to the at least one result, the indication comprising either a user interface to interact with the associated chat bot or a control to reveal the user interface to interact with the associated chat bot; and
      a broker bot interface associated with a broker bot, the interface allowing a user to interact with the broker bot;
   receiving information from the user via the broker bot interface;
   passing the information to the broker bot and the identified chat bot; and
   receiving responses from both the broker bot and the identified chat bot.

18. The medium of claim 17 further comprising synthesizing a chat bot for a search result that does not have an associated chat bot.

* * * * *